US012537098B2

(12) United States Patent
Labudde et al.

(10) Patent No.: US 12,537,098 B2
(45) Date of Patent: Jan. 27, 2026

(54) SECURE WIRELESS CONNECTIONS FOR MEDICAL DEVICES

(71) Applicant: Ypsomed AG, Burgdorf (CH)

(72) Inventors: Marc Labudde, Jegenstorf (CH); Simon Martin Bosshard, Hindelbank (CH)

(73) Assignee: Ypsomed AG, Burgdorf (CH)

( * ) Notice: Subject to any disclaimer, the term of this patent is extended or adjusted under 35 U.S.C. 154(b) by 146 days.

(21) Appl. No.: 18/311,106

(22) Filed: May 2, 2023

(65) Prior Publication Data
US 2023/0274826 A1 Aug. 31, 2023

Related U.S. Application Data

(63) Continuation of application No. PCT/EP2021/080468, filed on Nov. 3, 2021.

(30) Foreign Application Priority Data

Nov. 23, 2020 (CH) ..................... 01489/20

(51) Int. Cl.
G16H 40/60 (2018.01)
A61M 5/14 (2006.01)

(52) U.S. Cl.
CPC .............. *G16H 40/60* (2018.01); *A61M 5/14* (2013.01)

(58) Field of Classification Search
CPC .................. G16H 40/60; A61M 5/14
See application file for complete search history.

(56) References Cited

U.S. PATENT DOCUMENTS

| 12,047,417 B2 | 7/2024 | Labudde et al. |
| 2008/0262469 A1* | 10/2008 | Brister .................... A61M 5/24 604/246 |
| 2011/0215921 A1* | 9/2011 | Ben Ayed ............. H04W 12/06 340/539.11 |
| 2014/0206288 A1 | 7/2014 | Liu et al. |
| 2017/0180991 A1 | 6/2017 | Nicholls et al. |

(Continued)

FOREIGN PATENT DOCUMENTS

| CH | 718080 A2 | 5/2022 |
| EP | 3519021 A1 | 8/2019 |

(Continued)

OTHER PUBLICATIONS

Dideles, Myra, Bluetooth: A Technical Overview, Jun. 1, 2003, XRDS: Crossroads, The ACM Magazine for Students, vol. 9, Issue 4, p. 10 and figure 6. (Year: 2013).*

(Continued)

*Primary Examiner* — Brian A Zimmerman
*Assistant Examiner* — Cal J Eustaquio
(74) *Attorney, Agent, or Firm* — Dorsey & Whitney LLP

(57) ABSTRACT

A method for establishing a secure connection for transmitting data between a medical device system and a mobile device with wireless communication module is provided, where the medical device system comprises one or multiple devices, where the method comprises multiple steps. On the basis of a non-secure connection, a secure connection is established on the basis of a joint movement of mobile device and at least one device of the medical device system. Movement data are evaluated for this purpose.

13 Claims, 2 Drawing Sheets

(56) References Cited

U.S. PATENT DOCUMENTS

2019/0272498 A1* 9/2019 Swafford ............... H04W 4/80
2019/0281449 A1* 9/2019 Luo ................... H04W 12/0431
2020/0171249 A1* 6/2020 Rosinko ............ A61M 5/16836

FOREIGN PATENT DOCUMENTS

| EP | 3538183 A1 | 9/2019 |
| EP | 3572107 A1 | 11/2019 |
| EP | 3716567 A1 | 9/2020 |
| WO | 2022106197 A1 | 5/2022 |

OTHER PUBLICATIONS

Bluetooth Low Energy Application in home automation, Zhong, 2019 (Year: 2019) p. 12 and 13.*
International Preliminary Report on Patentability issued in International Application No. PCT/EP2021/080468 mailed on May 16, 2023, 9 pages.
International Search Report and Written Opinion Issued in International Application No. PCT/EP2021/080468, mailed no Jan. 19, 2022, 16 pages.

* cited by examiner

SECURE WIRELESS CONNECTIONS FOR MEDICAL DEVICES

CROSS-REFERENCE TO RELATED APPLICATIONS

This application claims priority to International Application No. PCT/EP2021/080468 filed on Nov. 3, 2021, which in turn claims priority to Swiss Patent Application No. 01489/20 filed on Nov. 23, 2020, each of which is incorporated by reference herein, in their entirety and for all purposes.

TECHNICAL FIELD

The present invention relates to the field of devices for administering fluid medications, and specifically embodiments of these administering devices with a function for wireless communication.

BACKGROUND

What are known as smart devices, such as smartphones, tablets, or smartwatches, can no longer be ignored in the modem world. Also "smart" are medical devices, such as infusion pumps, which today transmit data to other devices and receive them from the same. For example, the Ypsopump from the manufacturer Ypsomed sends administration histories to smartphones and computers via a Bluetooth connection. Radio remote controls for infusion pumps have been known for a long time; by way of example, to be noted here are the OmniPod system from the manufacturer Insulet as well as various models from the manufacturer Medtronic, wherein the Medtronic models have had this functionality for more than 20 years. Remote control via a smartphone app is newer—for example, as the manufacturer Sooil enables with the AnyDana app for its DanaDiabecareRS insulin pump. New risks also arise with the new control options. In the case of radio remote control, it must be ensured that no third party can take over the radio remote control function. If the remote control is a smartphone, a third party can attempt either to install an additional app on the smartphone which takes over the function, or can attempt to hack the official remote-control app. Under certain circumstances, the third party can also simply attempt to extract sensitive therapy data from the app. Alternatively, a third party can also eavesdrop on the radio communication, or can directly access the infusion pump via a third-party device—for example, as a "man in the middle" or as a separate remote control.

Radio connections between remote control and a medical device must be secure. The data, which if need be are stored on the remote control, must be stored securely. And, not least, the secure radio link between remote control and medical device must be established in a secure manner. The present invention deals with achieving the latter object.

EP 3716567 A1 discloses methods for securely establishing a secure radio connection between a medical administering device and a mobile device with an app.

The connection to be established is a Bluetooth connection, wherein the data transmitted between app and administering device are transmitted with end-to-end encryption from the app and the administering device. The data are thereby also encrypted by the Bluetooth system. The public key of the administering device, which is used for the end-to-end encryption, is thereby transmitted not via the Bluetooth link, but, rather, separately via a different connection, in order to prevent the key from being intercepted via the Bluetooth connection. A disadvantage of this method is that, in addition to the Bluetooth connection, a further connection technology such as NFC is required.

From US 20140206288 A1, a method is known for performing a device pairing (for a radio link) between two mobile devices, wherein the mobile devices are moved with one another. This involves establishing a connection between two devices, whereby a secure transmission of data from device to device can be established. However, the data within the devices can still be tapped.

The terms, "product," "medication," or "medical substance," in the present context include any flowable medical formulation which is suitable for controlled administration by means of a cannula or hollow needle in subcutaneous or intramuscular tissue—for example, a liquid, a solution, a gel, or a fine suspension containing one or more medical active ingredients. A medication can thus be a composition with a single active ingredient or a premixed or co-formulated composition with several active ingredients from a single container. The terms include in particular drugs, such as peptides (e.g., insulins, insulin-containing medications, GLP 1-containing preparations, as well as derived or analogous preparations), proteins, and hormones, biologically-obtained or active ingredients, active ingredients based upon hormones or genes, nutrient formulations, enzymes, and other substances both in solid (suspended) or liquid form. The terms also include polysaccharides, vaccines, DNA or RNA or oligonucleotides, antibodies or parts of antibodies, as well as suitable base substances, excipients, and carrier substances.

The term, "distal," refers to a side or direction directed towards the forward, injection-side, end of the administering device, or to a side or direction directed towards the tip of the injection needle. In contrast, the term, "proximal," refers to a side or direction directed towards the rear end of the administering device that is opposite the injection-side end.

In the present description, the term, "injection system" or "injector," is understood to mean an apparatus in which the injection needle is removed from the tissue after a controlled amount of the medical substance has been dispensed. In contrast to an infusion system, the injection needle in an injection system or in an injector thus does not remain in the tissue for a longer period of several hours.

SUMMARY

It is an object of the invention to provide methods for establishing secure radio connections between mobile devices and medical devices, and in particular administering devices, which represent methods alternative to known methods from the prior art. It is a further object of the invention to provide systems of mobile devices and medical devices which use the methods according to the invention.

The object is achieved by the method of independent claim 1 and/or the system of claim 12. Advantageous developments result from the dependent claims, the description, and the figures.

In one aspect, the invention relates to a method for establishing a secure connection for transmitting data between a medical device system and a mobile device. The medical device system can thereby be designed comprising one or more devices. By way of example, the medical device system can be a one-part, or multi-device administering device for administering a medication, and in particular a fluid or liquid medication. The mobile device can in particular be a mobile telephone, and specifically a smartphone. The method thereby comprises several steps.

In a first step, the medical device system and the mobile device are set into a mode in which a new secure connection can be established between the medical device system and the mobile device.

In a further step, a wireless connection for data transmission is established between the at least one device of the medical device system and the mobile device, wherein this connection is non-secure within the meaning of the invention. By way of example, this can thereby be a Bluetooth Just Works connection. Alternatively, NFC, WLAN, ZigBee, EnOcean, or similar protocols would also be possible. It should be expressly pointed out at this juncture that the non-secure connection between the at least one device of the medical device system and the mobile device can certainly also be encrypted. What is meant by "non-secure" is that it is not ensured with the connection that the correct medical device system is connected to the correct mobile device. Theoretically, other devices can be present in-between in the non-secure connections and intercept the communication. Furthermore, in the case of non-secure connections, it is also not certain which software or application exchanges data with the corresponding counterpart on the mobile device (or, rather, theoretically, in the medical device system).

In a further step, the mobile device and the at least one device of the medical device system are moved jointly. For example, this can occur in that a user holds the mobile device and the at least one device of the medical device system together in one hand and then moves the hand.

During the joint movement, both the mobile device and also the at least one device of the medical device system respectively generate information. The generated information is thereby based at least in part upon the executed movement. During the movement, both still transmit—in particular, also continuously transmit—at least fragments of the generated information to the respective other device.

The at least one device of the medical device system and the mobile device use their own generated information and the information fragments transmitted by the respective other device for establishing a secure connection between one another. For example, respective keys which can serve for the end-to-end encryption of the data transmission can thereby be generated at the at least one device of the medical device system and the mobile device. Since the mobile device and the at least one device of the medical device system which is moved can recognize the same movement patterns due to the joint movement, it is possible to generate secret keys via the movement, which secret keys are identical, and thus do not need to be exchanged. An interception is therewith also no longer possible, and the connection is thus secure within the meaning of the invention.

The method described in this aspect further has the advantage, for example, that, due to the joint movement, the transmitted information fragments can be uniquely associated by the mobile device or, respectively, the at least one device of the medical device system with the other device in each case, since the movement is joint movement and thus is simultaneous, and can thereby be generated by analog information. An end-to-end connection for the data exchange at the application level can also be ensured with the invention.

In a further aspect of the invention, the information generated on the mobile device and at the at least one device of the medical device system in each instance comprises, in addition to the continuously generated movement data, identification data that continue to be stored. These can be device type, serial number, software version, public key for data encryption, or similar information.

In an advantageous sub-aspect, in the case of a multi-device medical device system, it can thus be that the at least one device of the device system which is moved, before the movement, relates to data from a further device of the device system which then also enter into the generated information.

In a further aspect of the invention, the medical device system is a combination of an administering device and an add-on with electronics. The add-on can thereby be seen as an auxiliary device which can be connected to the administering device and which can flexibly supplement the administering device with further functions. The add-on can thereby be used in a graduated manner with several administering devices, which has the advantage that, for example, an administering device can be designed as a disposable device without electronics, and the add-on can be designed with electronics, so that electronics waste can be reduced. In this aspect of the invention, the add-on can thus take over the role of the at least one device of the medical device system and be moved jointly with the mobile device for the purpose of establishing the secure connection. Add-ons for administering devices are known to the person skilled in the art—for example, from EP 3572107 A1, EP 3519021 A1, or EP 3538183 A1. All three publications are herewith incorporated by reference into the present application.

In a further aspect of the invention, the at least one device of the medical device system and the mobile device are not only moved jointly, but always also simultaneously and in the same direction (directionally aligned). This has the advantage that the evaluation of the transmitted information can be designed more simply.

In a detail aspect of the invention, the at least one device of the medical device system and the mobile device are held on one another for the movement. By way of example, they are placed on one another by the user before the movement and then gripped with one hand, so that both the at least one device of the medical device system and the mobile device form a kinematic unit for the movement. In order to simplify the formation of the kinematic unit, in an advantageous embodiment, the at least one device of the medical device system and the mobile device can be fastened to one another temporarily and so as to be releasable. For example, this can take place by means of an adhesive or hook-and-loop connection. Alternatively, a separate auxiliary device can also be used with which the at least one device of the medical device system and the mobile device can be fastened to one another. For example, the auxiliary device can comprise clips or catches which serve for fastening.

In a further aspect, that at least one device of the medical device system as well as the mobile device in each case comprise at least one movement sensor. A movement sensor means a component with which a change in position is translated into an electrical variable which can be evaluated with suitable electronic circuitry. Furthermore, any type of acceleration sensor (such as inertial measurement units, gyro sensors, accelerometers) is also included in the term, "movement sensor," as it is used for the present invention.

In a further aspect of the invention, the wireless communication module of the mobile device comprises a Bluetooth unit. Complementary to this, the electronics of the at least one device of the medical device system likewise comprise a Bluetooth unit. The Bluetooth units serve for the wireless transmission of data between the mobile device and the at least one device of the medical device system. By way of example, at least one device of the medical device system can be an add-on as described in the publications EP 3572107 A1, EP 3519021 A1, or EP 3538183 A1, which have been supplemented by the functionality according to the invention.

Thus, according to a sub-aspect of the invention, a Bluetooth Just Works connection can be established as a non-secure connection, which then enables the transmission of the fragments between the mobile device and the at least one device of the medical device system.

In an alternative sub-aspect of the invention, a conventional Bluetooth connection with code input can be established for establishing the non-secure connection. Various possible variants which meet the Bluetooth specification (issued by the Bluetooth Special Interest Group) are sufficiently known to the person skilled in the art. By way of example, a code may be included with the medical device system. The code may be used for the purpose of establishing the non-secure connection (in the sense of the invention), is entered into the mobile device.

In a further sub-aspect of the invention, an exchange of additional information via NFC (near field communication) can take place for establishing a non-secure connection. For example, keys for establishing an encrypted Bluetooth connection between mobile device and the at least one device of the medical device system can thus be exchanged via NFC. This has the advantage that the interception of the keys becomes more difficult.

In a further aspect, the invention relates to a medical device system. According to the invention, the device system can be used to implement a method according to the invention. The medical device system can be designed as single-part or multi-device. Multi-device can mean a modular device system—as already described above, a system made up of an administering device and an add-on, or also a modular administering device.

The administering devices can be injection pens, auto-injectors, patch injectors, pre-filled syringes, infusion pumps—specifically, insulin pumps—patch insulin pumps, or similar devices, which can serve for self-administration of fluid or liquid medication.

As mentioned, the mobile device can be a mobile telephone or smartphone. According to the invention, however, what are known as Personal Digital Assistants (PDA's) without telephone functionality can also be used. Furthermore, according to the invention, remote controls for the administering devices are also considered to be mobile devices. Smartwatches, tablets, or notebooks are also included.

BRIEF DESCRIPTION OF THE DRAWINGS

Selected embodiments of the invention are described in the following in conjunction with the appended figures. These embodiments are intended to show basic possibilities of the invention and are in no way to be interpreted as limiting.

DETAILED DESCRIPTION

Figure 1A:
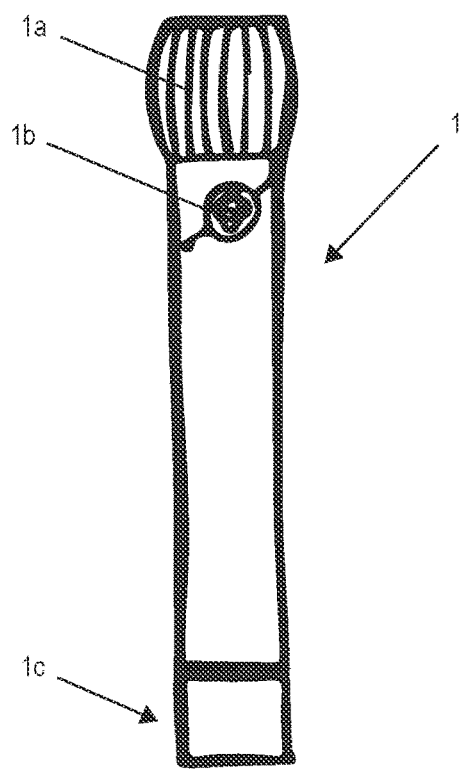
FIG. 1a shows a medical device system in the form of an injection pen.
Figure 1B:
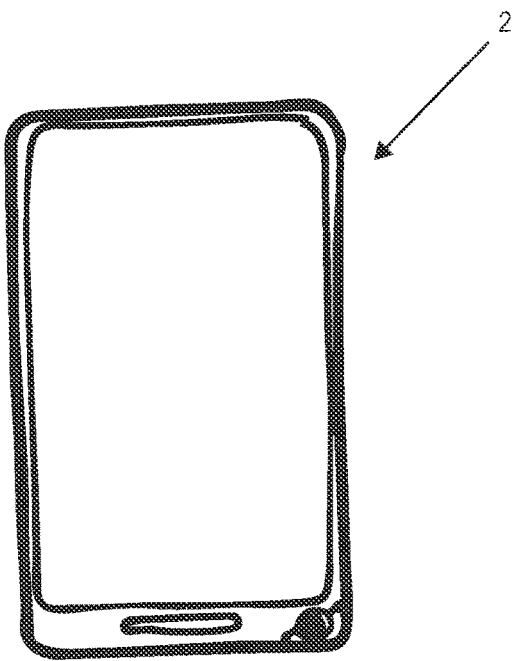
FIG. 1b shows a mobile device in the form of a smartphone.
Figure 2:
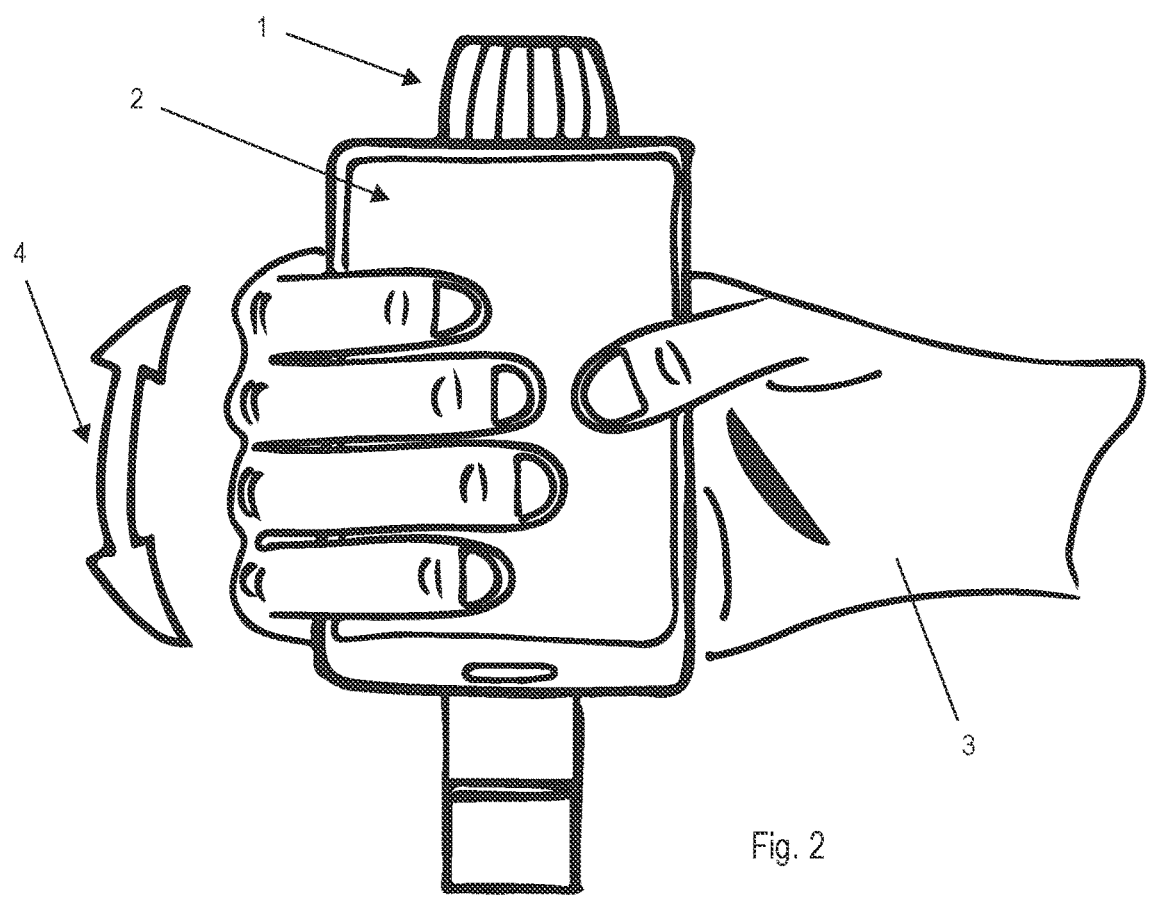
FIG. 2 shows the mobile device and the medical system (injection pen) during the movement by a user (symbolized by a hand) according to the invention.

FIGS. 1a through 2 show an example of a medical administration system in the form of the injection pen 1, and of a mobile device in the form of a smartphone 2. It should be emphasized once again at this point that the injection pen 1 is an example; the administration system can also be an infusion system or another system described above. The smartphone 2 is also merely an example; instead, a tablet, notebook, or smartwatch could also take over the function.

The injection pen 1 functions in principle like classical injection pens, which are well known to the person skilled in the art (examples: Novopen 5 from Novo Nordisk, HumaPen Memoir from Eli Lilly, or the UnoPen from Ypsomed). The injection pen 1 has a dosing element 1a at which a dose to be administered can be set. A set dose is thereby indicated by means of the dose indicator 1b. An injection needle can be detachably attached (not shown) to the end 1c, situated opposite the dosing element 1a, of the injection pen 1, through which injection needle a fluid medication can be administered according to the set dose.

Electronic elements (not shown) are arranged inside the injection pen 1, which electronic elements are supplied by a suitable power source (as mentioned above, the electronics could also be stored in an add-on). The electronic elements comprise at least one movement sensor and a communication module, wherein both are connected to one another via a suitable control element, such as a controller or processor, and are controlled and monitored via the control element. The communication module serves for wireless communication with the smartphone 2. The control element is designed at least to receive measurement data from the movement sensor, to process said measurement data into information, and to transmit at least portions thereof to the smartphone 2 via the communication module. Furthermore, the control element is designed to receive from the communication module information fragments, which are transmitted from the smartphone 2 to the injection pen 1. In advantageous embodiments, the communication module is a Bluetooth module. Alternatively, NFC, WLAN, and further technologies are also suitable.

The smartphone 2 has the typical equipment of smartphones, as are sufficiently known to the person skilled in the art from models such as the Samsung S10 or the Apple iPhone 11. The smartphone 2 thus also has, among other things, at least one movement sensor, various communication modules such as mobile networks, Bluetooth, and/or NFC, as well as a potent control and data processing device. As is typical on smartphones, various software applications, known as apps, are also installed on smartphone 2. A specialized app serves as an end point for the secure data transmission between injection pen 1 and smartphone 2. This means that data which are transmitted securely from the injection pen 1 to the smartphone 2 are only converted into plain text in the specialized app. The specialized app thereby represents a secure container for the data, so that further apps installed on the smartphone 2 have no access to the data in the container. Data that are not presently being displayed in the app or being processed in any way are preferably stored in encrypted form in the container of the app. In an advantageous development, the app can be deactivated or wiped by a remote server, which is advantageous if the smartphone has been stolen, for example. The app can be used not just to receive or send data from or to the injection pen. The app can also be a health management app, to which have been added the features according to the invention. Such management apps are known to the person skilled in the art; examples are SiDiary from Sinovo or mySugr from mySugr. Due to the secure communication according to the invention, in further advantageous developments, a remote control function can be added to the app so that the injection pen 1 (or, more generally, the medical system) can be remotely controlled via the specialized app.

FIG. 2 schematically shows a method according to the invention for establishing a secure connection for transmitting data between the injection pen 1 and the smartphone 2. The user (schematically represented by the hand 3) sets both devices into a pairing mode, in which the establishment of a connection is possible. Injection pen 1 and smartphone 2 then establish a wireless connection automatically (or with the involvement of the user), which, in the sense of the invention, is not yet secure. However, in this state, data can be exchanged between the injection pen 1 and the smartphone 2.

In the present example, this can proceed in such a way that a Bluetooth Just Works connection is established between injection pen 1 and smartphone 2. The establishment can thereby be triggered by placing the devices into the pairing mode. The Just Works connection establishes an encrypted, wireless connection between the injection pen 1 and the smartphone 2. Although, as mentioned, this connection is encrypted, it is not secure in the sense of the present invention. In the case of the Just Works connection, the data are decrypted after reception in the Bluetooth unit of the smartphone 2, and not in the specialized app provided for this purpose. This means that the possibility exists that a further app can intercept the decrypted data. Therefore, it is important that, after establishing the Just Works connection, a further security layer be added in which the data exchanged between injection pen firmware and the specialized app on the smartphone 2 are additionally encrypted (end-to-end encryption). This means that data which have been encrypted by the injection pen firmware in the control element of injection pen 1 are encrypted once again in the Bluetooth module (communication module), then decrypted a first time in the Bluetooth unit, and finally decrypted once again in the specialized app provided for this purpose.

In order to establish this end-to-end encryption, the user grips both devices together with a hand 3 and moves them jointly, which is symbolically represented by the arrow 4 in FIG. 2. The movement may thereby be arbitrary, wherein it should not fall below a certain minimum, so that a sufficient measurement signal (i.e., a sufficiently large measured data set) can be generated.

During the movement, the movement sensors in the injection pen 1 and in the smartphone 2 generate measurement signals which are taken and processed by the control element of the injection pen 1 or by the control and data processing device of the smartphone 2, respectively. Since the two devices are held together in hand 3, the sensors measure comparable movement patterns—also in terms of time. The measurement signals are processed in injection pen 1 and smartphone 2 into information, which is likewise comparable. In the smartphone 2, the specialized app thereby processes the measurement signals into information. The information generated in this way, or fragments thereof (on injection pen 1 and smartphone 2), can be exchanged between the devices and compared.

The comparison can be used for the mutual identification and authentication of smartphone 2 and injection pen 1. Since only smartphone 2 and injection pen 1 are moved simultaneously and identically, a risk of confusion with third-party devices or, respectively, the possibility of hacking by third-party devices is minimized.

In one possibility of the invention, after the successful identification of the two devices between one another, in each case public keys which were stored on the devices or were generated (ad hoc) are exchanged between injection pen 1 and the specialized app of the smartphone 2, so that end-to-end encryption can be established between injection pen 1 and the specialized app of smartphone 2.

In an embodiment of the invention, the information generated from the movement can also be used for creating keys. For example, algorithms which generate a key from the information can be stored on injection pens 1 and the specialized app of the smartphones 2. In one instance, an identical key can be generated on both devices, wherein the keys are checked by mutual challenges (encryption and decryption of test information, checksums, or hashes). Alternatively, the generation of key pairs is also possible. Here, the typical and established cryptographic methods are known to the person skilled in the art.

In a further embodiment, the information is checked in that the movement is continuously processed into information, and information (fragments) is continuously exchanged between smartphone 2 (specifically, the specialized app) and injection pen 1, and is used for identification, authentication, and/or end-to-end encryption. The connection can be made even more secure by comparing information or information fragments from several movement fragments.

Figure 3:
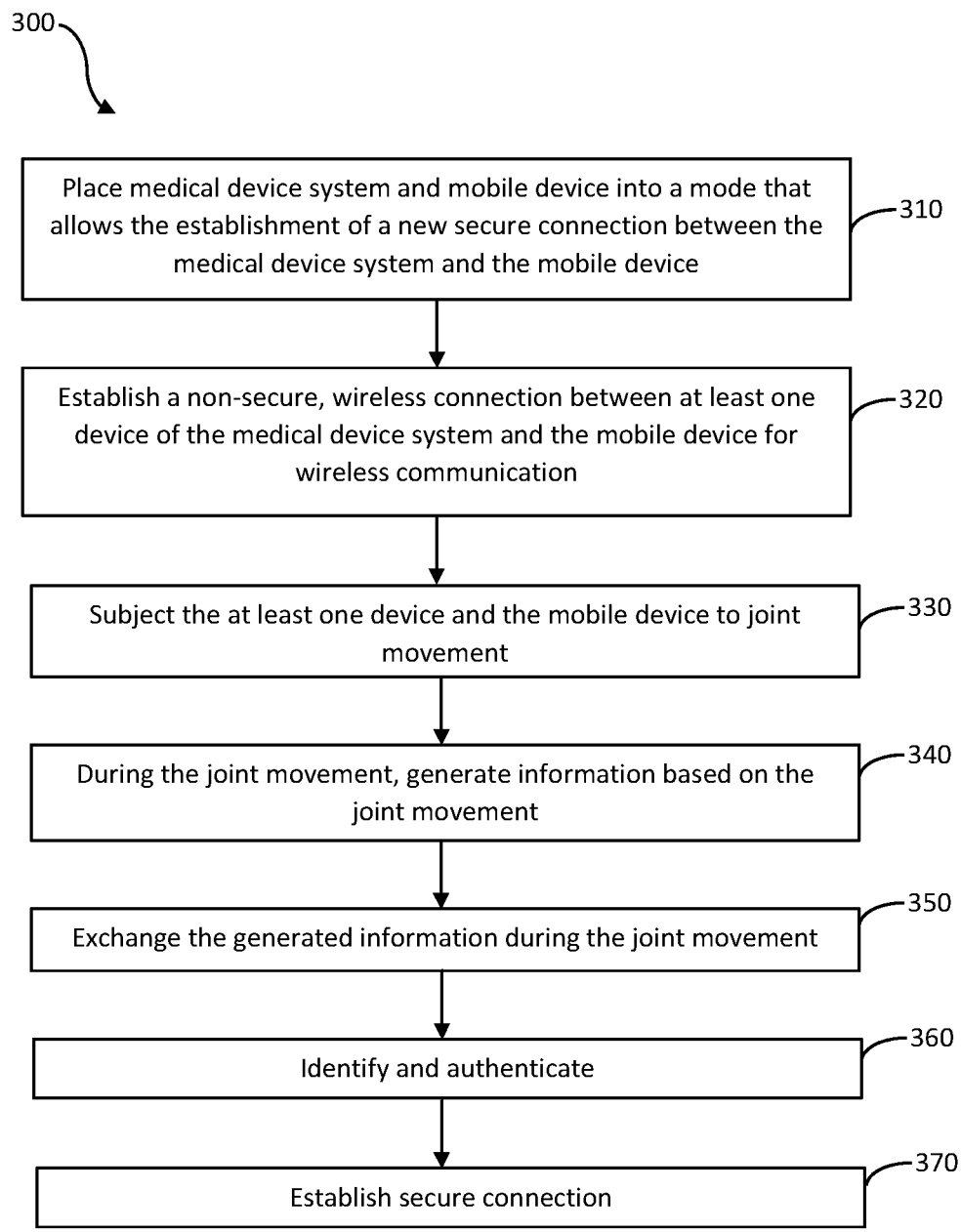
FIG. 3 is a flowchart of a method for establishing a secure connection for transmitting data between a medical device system and a mobile device with a wireless communication module, according to the present disclosure.

FIG. 3 is a flowchart of a method 300 for establishing a secure connection for transmitting data between a medical device system and a mobile device with a wireless communication module, according to the present disclosure. The method 300 involves the steps of placing the medical device system and the mobile device into a mode that allows the establishment of a new secure connection between the medical device system and the mobile device in operation 310. The method 300 proceeds in operation 320 by establishing a non-secure, wireless connection between at least one device of the medical device system and the mobile device, where the at least one device includes an electronic communication module for wireless communication. Operation 330 involves subjecting the at least one device and the mobile device to joint movement, where the joint movement involves simultaneous, directionally aligned movement. During this joint movement, the moving device and the mobile device each generate information based at least partly on the joint movement in operation 340. Again, during this joint movement, the at least one moving device and the mobile device exchange at least fragments of the respectively generated information mutually and continuously in real time in operation 350. In operation 360, the mutually and continuously exchanged information fragments serve for mutual identification and authentication of the medical device system and the mobile device. As such, in operation 370, upon this mutual identification and authentication, the secure connection is established.

Various functionalities described herein may be accomplished with the use of a computer, including the controller or processor and non-transitory computer readable medium or memory, with instructions stored thereon to be executed by the controller or processor. For instance, a computer-readable storage medium with an executable program stored thereon may instruct the controller or processor to perform the functions provided herein.

LIST OF REFERENCE SIGNS

1 Medical device system: injection pen
1a Dosing element

1b Dose indicator
1c (Distal) end
2 Mobile device: smartphone
3 Hand of the user
4 Movement information
300 Method
310-370 Method steps

What is claimed is:

1. A method for establishing a secure connection for transmitting data between a medical device system and a specialized app of a mobile device with a Bluetooth wireless communication module, wherein the medical device system comprises one or more devices, wherein the method comprises steps of:
    placing the medical device system and the mobile device into a mode that allows the establishment of a secure, end-to-end encrypted connection between the medical device system and the specialized app of the mobile device;
    establishing a non-secure, wireless connection between at least one device of the medical device system and the mobile device, the at least one device comprising an electronic communication module for Bluetooth wireless communication, wherein the established wireless connection is an encrypted Bluetooth Just Works pairing; and
    subjecting the at least one device and the mobile device to joint movement, the joint movement comprising simultaneous, directionally aligned movement,
    i. wherein, during the joint movement, the at least one moving device and the specialized app of the mobile device each generate information based at least partly on the joint movement,
    ii. wherein, during the joint movement, the at least one moving device and the specialized app of the mobile device exchange at least fragments of the respectively generated information mutually and continuously in real time over the established encrypted Bluetooth pairing,
    iii. wherein the information fragments mutually and continuously exchanged over the non-secure, encrypted Bluetooth pairing serve for mutual identification and authentication of the medical device system and the specialized app of the mobile device, and
    wherein the secure, end-to-end encrypted connection using the specialized app is established over the established encrypted Bluetooth pairing based upon i.-iii.

2. The method according to claim 1, wherein the mutually and continuously exchanged information fragments further serve to encrypt the secure connection.

3. The method according to claim 1, wherein the generated information comprises movement data and identification data non-transiently stored in the medical device system and in the specialized app of the mobile device, and wherein the identification data is used with the movement data for establishing the secure connection.

4. The method according to claim 1, wherein the medical device system comprises an injection pen and an electronic add-on for the injection pen, and wherein the at least one moving device is the add-on, the add-on configured to add data of the injection pen to the generated information and transmit said data and generated information.

5. The method according to claim 1, wherein the at least one device and the mobile device are held together for the joint movement and form a kinematic unit for the joint movement.

6. The method according to claim 1, wherein the at least one moving device of the medical device system and the mobile device each comprise at least one movement sensor configured to generate measurement signals for use in generating the generated information.

7. The method according to claim 1, wherein, for establishing the Bluetooth Just Works pairing, at least one code is exchanged between the at least one device and the mobile device.

8. The method according to claim 1,
    wherein the at least one device comprises a first near-field communication unit ("NFC unit") for wireless communication, and the mobile device comprises a second NFC unit for wireless communication,
    and
    wherein, for the Bluetooth Just Works pairing, keys are exchanged between the at least one device and the mobile device by the first NFC unit and the second NFC unit.

9. A method according to claim 1, wherein, during the joint movement of the at least one device and the mobile device, transmission power of the Bluetooth wireless communication module of the at least one device and the Bluetooth wireless communication module of the mobile device can be reduced due to a spatial proximity of the at least one device and the mobile device during the joint movement.

10. A medical device system, wherein the medical device system comprises one or more devices, wherein at least one device of the medical device system comprises:
    an electronic controller communicatively coupled to a Bluetooth wireless communication unit such that the at least one device is configured to send data to and receive data over a non-secure, encrypted Bluetooth Just Works pairing; and
    at least one movement sensor communicatively coupled to the electronic controller, wherein the electronic controller is configured to receive electronic signals from the at least one movement sensor and generate information for use in establishing a secure, end-to-end encrypted connection with a specialized app of a mobile device, wherein the information is generated and continuously exchanged by the wireless communication unit over the non-secure, encrypted Bluetooth pairing during a joint movement between the at least one device and the mobile device, and the generated information is used at least partly for establishing the secure, end-to-end encrypted connection using the specialized app over the non-secure, encrypted Bluetooth pairing.

11. The medical device system according to claim 10, wherein the medical device system is an infusion pump.

12. The medical device system according to claim 11, wherein the infusion pump is configured as a modular patch pump for wearing directly on skin.

13. A method according to one of claim 1, wherein the placing of the medical device system and the mobile device into a mode that allows a new secure connection between the medical device system and the mobile device takes place via a movement of the medical device system and/or the mobile device.

* * * * *